United States Patent [19]

Spinosa et al.

[11] Patent Number: 4,709,818
[45] Date of Patent: Dec. 1, 1987

[54] APPARATUS AND METHOD FOR COMPRESSION PACKAGING A COMPRESSIBLE ARTICLE INTO A CONTAINER AND A CONTAINER THEREFOR

[75] Inventors: Dominic J. Spinosa, Wantagh; Frank Knoll, Huntington Station, both of N.Y.

[73] Assignee: East/West Industries, Inc., Hauppauge, N.Y.

[21] Appl. No.: 767,412

[22] Filed: Aug. 20, 1985

[51] Int. Cl.$^4$ .............................................. B64D 17/50
[52] U.S. Cl. ................................ 206/524.8; 206/83.5; 244/148
[58] Field of Search ........................... 206/524.8, 83.5; 244/148, 147, 151 A, 151 B

[56] References Cited

U.S. PATENT DOCUMENTS

| | | | |
|---|---|---|---|
| 1,970,193 | 8/1934 | Riebel, Jr. | 206/524.8 |
| 3,458,966 | 8/1969 | Dunbar et al. | 206/524.8 |
| 3,516,217 | 6/1970 | Gildersleeve | 206/524.8 |
| 3,574,642 | 4/1971 | Weinke | 206/524.8 |
| 4,465,189 | 8/1984 | Molzan | 206/524.8 |
| 4,488,647 | 12/1984 | Davis | 206/524.8 |
| 4,577,817 | 3/1986 | Hernandez | 206/524.8 |

Primary Examiner—Joseph Man-Fu Moy
Attorney, Agent, or Firm—Hoffmann, Dilworth, Barrese & Baron

[57] ABSTRACT

A container and method for compression packaging a compressible article which includes use of a container having two rigid sides each connected to the other at a first end establishing a spaced-apart, parallel, and substantially co-extensive relationship between the sides. The container also includes closure means at the other end of each side for releasably holding the sides in the relationship established by the first end against the face of the compressible article held therebetween, and retaining mean fixed along the sides of the container. The retaining means has an open condition which permits compression packaging of the article and a closed condition which retains the compressible article under pressure in the container until released by the closure means.

13 Claims, 12 Drawing Figures

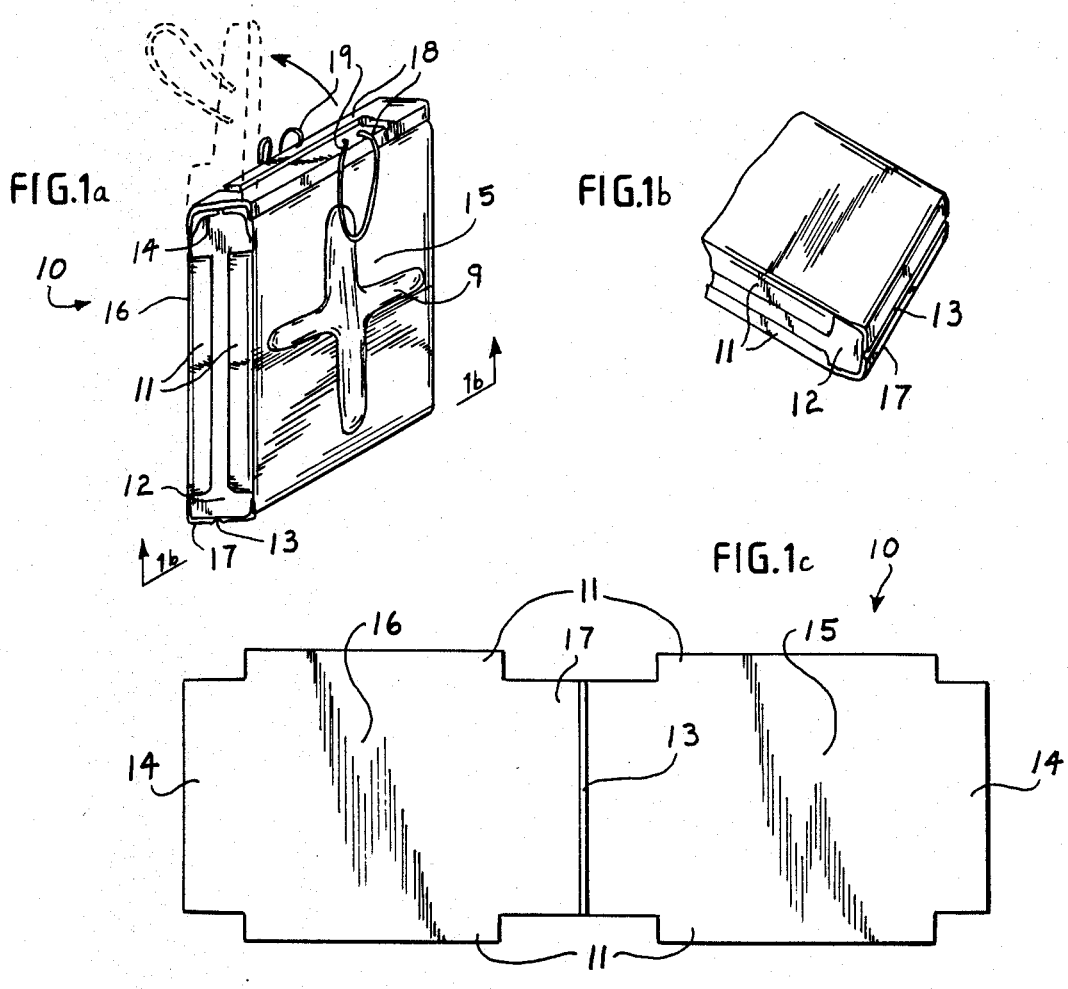
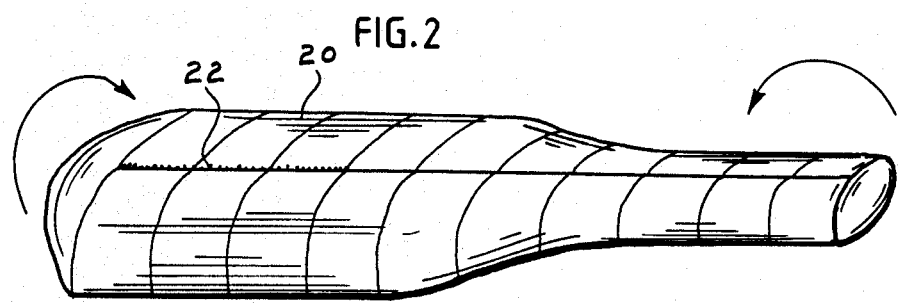
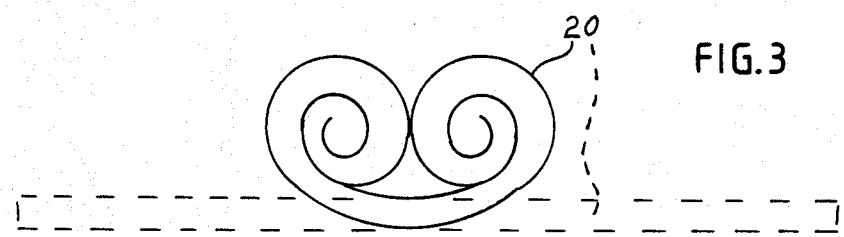

APPARATUS AND METHOD FOR COMPRESSION PACKAGING A COMPRESSIBLE ARTICLE INTO A CONTAINER AND A CONTAINER THEREFOR

BACKGROUND OF THE INVENTION

The present invention relates to compression packaging of compressible articles, and, in particular, to packaging bulky compressible articles in low volume containers.

It is known in the art of packaging that there is a need to provide compact, high-pressure packaging in order to minimize storage space required by bulky, compressible articles such as sleeping bags, parachutes, and compressible shelters such as tents, etc. This requirement is especially noticeable in those environments in which the compressible article will only be used on a one-time basis, such as an emergency situation. Other situations in which a compressible article should be packaged in a limited space before being utilized are those wherein the article must be transported in a confined area before being utilized.

A particularly demanding situation is the provision of compressible articles in a survival kit for use in high performance aircraft ejection seats. Components must occupy minimal space and be lightweight while providing a secure, reliable, long-term storage capability. For example, it is important to include a sleeping bag, preferably one made with goose down which is effective in arctic conditions, which must be stored for a long time and be capable of reliable opening during emergency conditions. The bag should be easily removable from the container since the crew may have suffered injuries before, during or after the ejection. Moreover, the sleeping bag itself should be capable of being compressed into a small container and yet effective after removal therefrom. Also the sleeping bag should be able to be packaged without being damaged.

Various attempts have been made to provide an apparatus and method for meeting all of these requirements is disclosed, for example, in U.S. Pat. No. 4,501,362 to Duncan which shows a hinged container with a releasable closure for receiving a compressed down sleeping bag therein. The container includes a pair of mating top and bottom members coupled at one end by a hinge and a closure having a pair of bars rigidly coupled respectively to the top and bottom members which, in turn, are releasably connected to the top and bottom members by means of a pair of torsional shear bolts. The sleeping bag is compression packaged into the apparatus by a hydraulically-actuated single compressing ram movable into and out of a sleeve on which the bag container is releasably secured at one end thereof. The Duncan apparatus and method, however, suffers from the problem of having many very small parts which must be assembled with great care and precision in order to effect the compression packaging. Furthermore, the uncertainty associated with the use of shear bolt connections and releases detract from the reliability of the Duncan apparatus. Other problems inherent in the Duncan apparatus and method include excessive travel distance of the compressible article and the requirement for very high compression force on the single compressing ram in order to effect compression packaging.

It is, therefore, an object of the present invention to provide a compression packaging system for compression packaging of compressible articles such as sleeping bags, parachutes, etc. in a small lightweight secure container for reliable storage and easy removal of the article from the container.

It is another object of the invention to provide an apparatus and method which has minimal parts and is easily compression packaged by use of reduced compression force and minimum article travel to prevent damage to the compressible article.

BRIEF DESCRIPTION OF THE INVENTION

The present invention provides a method and apparatus for compression packaging of compressible articles which includes a container having two substantially rigid planar rectangular sides each of which is connected to the other at a first end for establishing a spaced-apart, parallel and substantially coextensive relationship between such sides. The sides can be made of any rigid material such as metal, plastic, or any other substantially rigid material which will maintain the integrity of its shape even under the force of the compressed article contained therein. A preferred embodiment includes the use of reinforcing beads formed in the sides whereby lighter material can be used without a loss of rigidity or stiffness. The reinforcement beads can be arranged parallel to each other or perpendicular to each other.

A closure means is included at the other end of each of the sides for releasably holding the sides in the established relationship against the force of the compressed article held therebetween, while a retaining means is fixed along the sides of the container. The retaining means have an open condition which permits compression packaging of the compressible article therein, and has a closed condition for retaining the compressible article under pressure so that the compressible article can be packaged in the container under pressure and retained therein until released by the closure means. Preferably, the sides are connected at the first end by a common rectangular extension fixed substantially perpendicular to each side, the extension also including a hinge means such as a weakened rib along such extension in order to permit a separating movement of the sides from each other. This feature enables the sides to be opened in order to remove the compressed article upon release of the holding means.

In a preferred embodiment the closure means includes at least one substantially "U"-shaped bracket for encompassing the other ends of the sides. More preferably, there are at least two such brackets which have an extension for removing the brackets from the sides. This removing means can be a pull lanyard or cord attached to the brackets at one end thereof in order to remove the bracket by rotation away from the container.

The retaining means for the container can include flanges extending outwardly from the sides in the open condition which can be folded substantially perpendicular to the side in the closed condition so that the packaged article can be retained in the container. In this embodiment the retaining means can further include a retaining plate between the compressed article and the folded flanges whereby the compressed article is completely encased. In a preferred embodiment of the present invention, the dimensions of the fully assembled container can be 11 inches long by 11 inches wide by about 1¾ inches thick.

It is also contemplated that the present invention can include a packaging device for compression packing compressible articles in the container having a guide means for providing a restricted travel path for the compressible article as it is compression packaged into the container. The packaging device also can include compression means for compressing the article through the guide means into the container, while there is also included retaining actuating members for closing the retaining means with the article compressibly placed in the container.

In one embodiment the guide means can be a sleeve having an inside dimension substantially coextensive with the inside perimeter of the container, such sleeve having a depression in the interior for receiving the container so that the interior wall of the container substantially registers with the interior wall of the sleeve.

In a preferred embodiment, the compression means can include two rams on either end of the guide means which can be activated, preferably simultaneously, for compressing the article in the container and being withdrawn from the container. The retainer actuator can include levers which force the retaining means to the closed condition and are activeable for forcing the retaining means to the closed condition after the article has been compressed into the container.

The present invention further includes a method for compression packaging a compressible article in a container of the type described above which includes orienting the compressible article through the container while the retaining means is in the open condition, followed by compressing the compressible article into the container and closing the retaining means to the closed condition whereby the compressed article is retained in the container in the compressed condition. In a preferred method, the compressible article can be precompression vacuum packaged and shaped in a compressible package in order to facilitate orienting and compressing the article into the container. The orienting required in the present method can be achieved by use of the fixture having a guide means which restricts the path of travel of the compressible article into the container during compressing and the compressing can be effected by forceably ramming the article into both sides of the open container. Preferably such double ramming is performed simultaneously while the article is centered in the container until the compressed article is compressed completely into said container thereby minimizing the travel distance of the material of the article and requiring a lower compression force.

As a result of the present invention, a single sheet of substantially rigid material can be used to form the container with a minimal amount of additional parts, for example, the "U"-shaped clamp releasable holding means, and the retaining plates used to totally encompass the compressed article within the retaining means. Other advantages include reduced or lower compression forces required to compress the article in the container, minimum travel distance of the material during compression packaging, a simplified compression fixture when precompression vacuuming is employed, and improved insertion control. Prevacuum shaping also causes natural sizing and allows production staging.

For a better understanding of the present invention, together with other and further objects, reference is made to the following description, taken in conjunction with the accompanying drawings, and its scope will be pointed out the appended claims.

BRIEF DESCRIPTION OF THE DRAWINGS

Preferred embodiments of the invention have been chosen for purposes of illustration and description and are shown in the accompanying drawings, wherein:

FIG. 1 is a prospective view of a preferred embodiment of the present invention in the fully assembled condition, with a depiction in phantom of the operation of the releasable holding means;

FIG. 1b is a prospective view of the fully assembled container taken along lines b—b in FIG. 1a;

FIG. 1c depicts in plan view a single sheet of material which can be molded to form the assembly shown in FIGS. 1a and 1b;

FIGS. 2 through 10 show the steps of a process in accordance with the preferred embodiment of the present invention by which a bulky down compressible article such as a sleeping bag can be compressibly packaged; and FIGS. 6-10 schematically depict the packaging device of the invention.

DETAILED DESCRIPTION OF THE DRAWINGS

Figure 5:
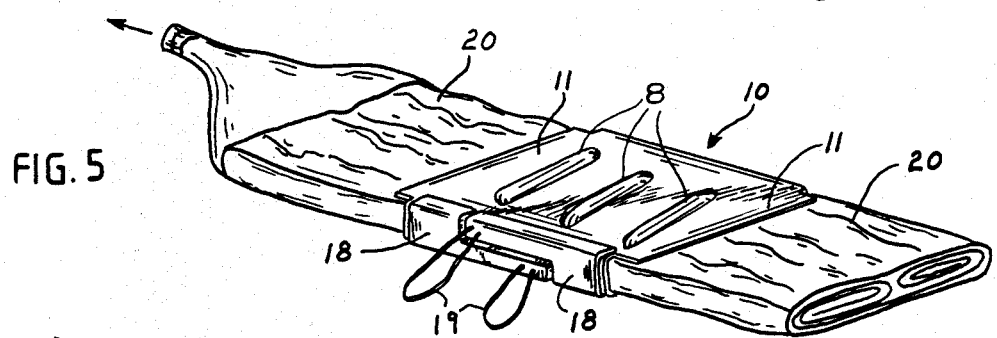

Referring to FIG. 1a, there can be seen a fully assembled container 10 prepared in accordance with the present invention. Specifically, the container 10 is made of a substantially rigid material having sides 15 and 16, with formed beads 9 (or 8 and 7 in FIGS. 5 and 6) for increase section modulus for stiffness and rigidity, which have a spaced-apart parallel relationship and are joined along one end by a common extension 17 which is perpendicular to each of the sides and which includes a weakened rib 13 in order to effect a hinged connection so that the sides can be separated from each other upon release. The high compression package 10 includes top extensions 14 which have been bent towards each other in order to accommodate a friction fit of retaining clamps 18. Retaining clamps 18 are essentially "U"-shaped clamps which hold the sides 15 and 16 of the container against the force of pressure exerted thereagainst by the compressed article packed therein. Lanyards 19 have been fixed to extensions of the clamps 18 so that the user can easily remove such clamps by rotating them upwardly as shown in phantom in FIG. 1a and then remove them.

The container also has a means for retaining the article after it has been compressibly packed therein which includes flanges 11 shown in the open condition while the compressible article is packaged therein, and which are folded towards one another as shown in FIG. 1a, preferably with a retaining plate 12 positioned immediately inside the flanges 11 in the closed condition. Referring to FIG. 1c, the simplicity and effectiveness of the present invention is clearly shown by referring to the single sheet of rigid material, such as metal or rigid plastic material, which includes each of the features required for effecting the high compression packaging. These features include extended flanges 11, top extensions 14 and common connecting extension 17 which stretches between sides 15 and 16. Consequently, there is no need whatsoever for a multitude of various fasteners, or attachment means such as bolts, nuts, etc. as required in previous high compression packaging.

Figure 4:
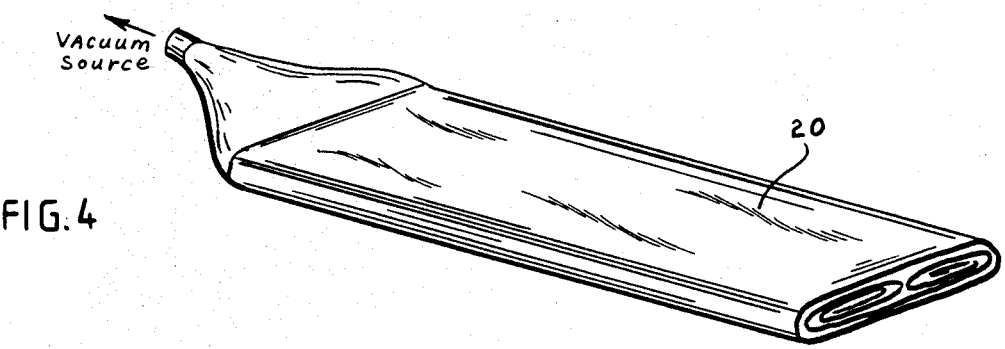

Referring to FIGS. 2 through 10 there can be seen a sleeping bag 20 which is oriented lengthwise, smooth and flat with the zipper located in the top center in order to place it in a protected position. The bag can then be tightly rolled from both ends towards the center as shown schematically in FIG. 3. The double roll can then be inserted into a vacuum package such as a thin polyethylene bag as shown in FIG. 4 which is attached to a vacuum source and dropped in a sizing fixture (not shown) over which a plate is placed as a vacuum pulls the bag down. Preferably the resultant package can be approximately 30 inches by 10 inches by 1½ inches in size as shown in FIG. 4.

If a vacuum is continuously applied, the package is quite stiff thereby facilitating pushing it into the assembled container on which the flanges 11 are in the open condition. See FIG. 5. The sleeping bag can be centered in the container and placed in a fixture 30 (FIG. 6) having a guide means 32 for maintaining restricted travel of the sleeping bag into the container 10. The fixture 30 is preferably formed with a depression 33 in the guide wall 32 to accommodate the thickness of the container 10 so that the interior surface of the container 10 substantially registers with the inside surface of the guide 32.

Figure 6:
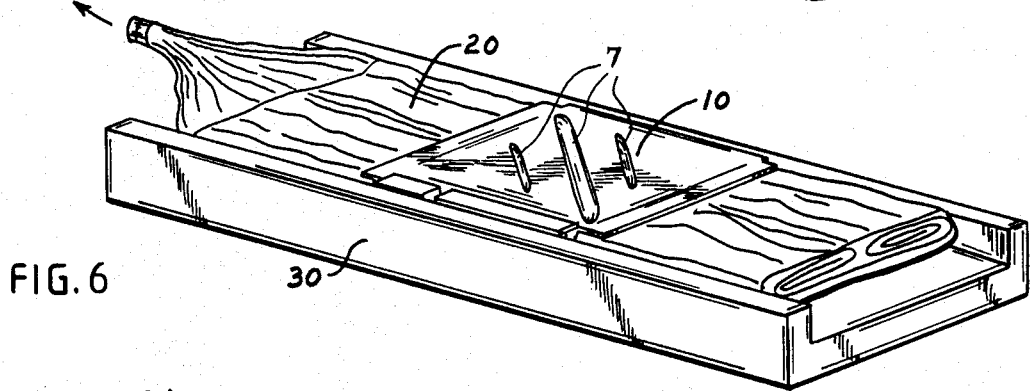
Figure 7:
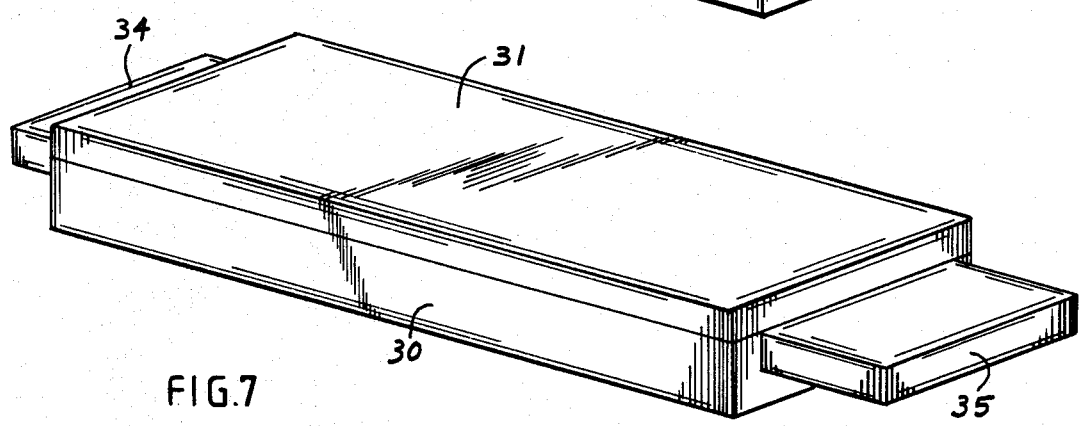
Figure 8:
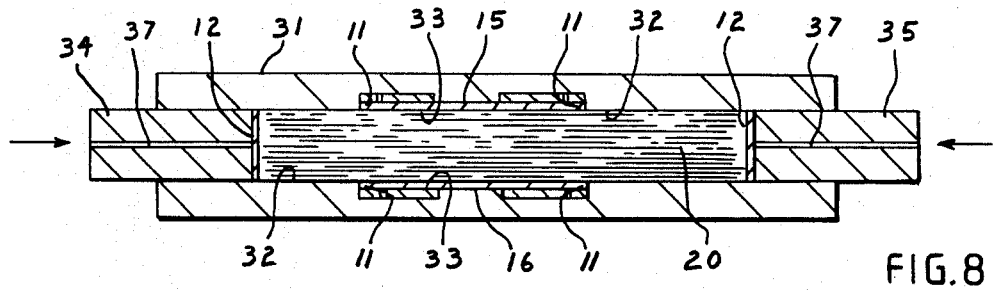

FIG. 6 shows the packaging fixture with the container and sleeping bag positioned for compression packaging therein. In FIG. 7 the packaging fixture is shown schematically in the assembled condition with two ramming means on either end of the assembled fixture 30. The two arrows in FIG. 8 indicate the direction of the compressive forces exerted against the sleeping bag and the restricted travel path provided by the guide sleeve surfaces 32.

Figure 9:
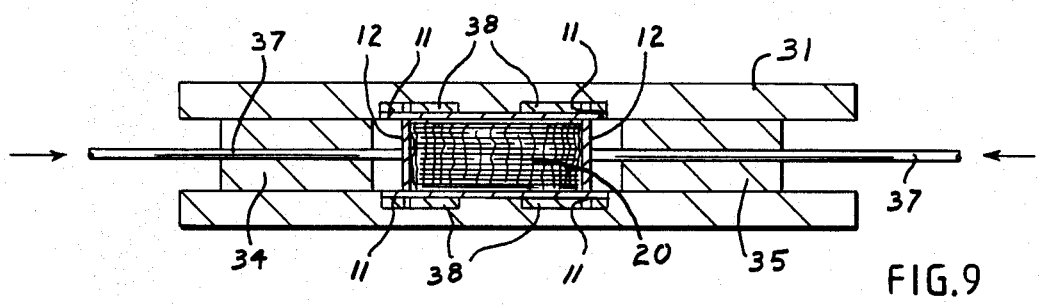
Figure 10:
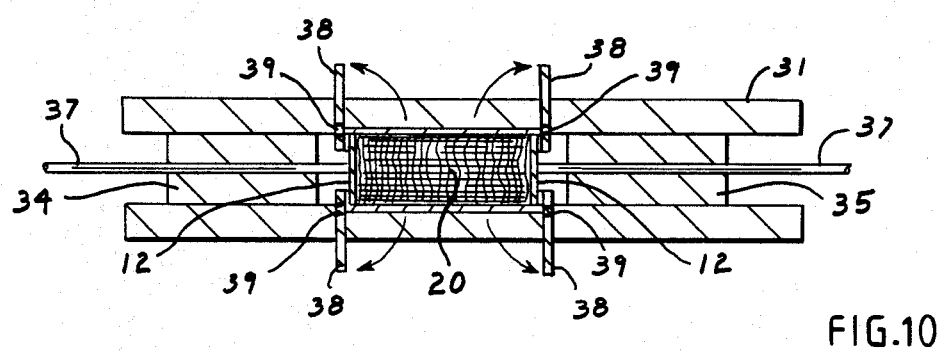

In FIGS. 9 and 10 there is shown a cross section of the schematics of the assembled packaging fixture in which the retaining plates 12 have compressed the sleeping bag past the flanges 11 whereupon flange levers 38 are pivoted around pivot points 39 to force the flanges into the closed position shown in FIG. 10. The compression motion is effected by ram bars 37. The rams are driven towards each other, generally traveling at about 11¼ inches on each end until compression is complete. The flange levers 38 are moved 90° to close the flanges 11 down over the retaining plates 12 so that the sleeping bag is totally packaged and ready for removal from the fixture and shipment.

As a result of the double ram compression method of the present invention, hard spots in the package are minimized and the distance of movement of the material is minimized as well as requiring lower compression forces on the ram members. Furthermore, as a result of precompression vacuum packing, the compression fixture has been simplified while further reducing compression forces and improving insertion control. Prevacuum shaping also aids in the present process by causing natural sizing and allowing staged production. Surprisingly, the present invention when used with a down sleeping bag allows the sleeping bag to recover substantially to its precompression condition retaining the fluff of the down stuffing material as well as the quality of the cloth cover of the sleeping bag.

Thus far there have been described what are presently believed to be the preferred embodiments of the invention, those skilled in the art will realize that changes and modifications may be made thereto without departing from the spirit of the invention, and it is intended to claim all such changes and modifications and fall within the true scope of the invention.

What is claimed is:

1. A container for compression packaging of a compressible article comprising:
   two rigid planar rectangular sides each connected to the other at a first end for establishing a spaced-apart, parallel, and substantially coextensive relationship between said sides,
   closure means at the other end of each said side for releasably holding said sides in said established relationship against the force of said compressed article held therebetween, and
   two retaining means arranged on said sides opposite each other and extending between said ends, said retaining means having an open condition and a closed condition, said open condition permitting compression packaging of said compressible article through said retaining means and said closed condition retaining said compressible article under pressure, whereby said compressible article is packaged in said container under pressure and retained therein until released by said closure means.

2. The container of claim 1 wherein said sides are connected at said first end by a common rectangular extension fixed substantially perpendicular to each side.

3. The container of claim 2 wherein said extension comprises a hinge means for permitting separating movement of said sides.

4. The container of claim 3 wherein said sides and said extension is a continuous substantially rectangular sheet of rigid material, and said hinge means is a weakened rib extending across said extension.

5. The container of claim 4 wherein said sides includes reinforcemen beads.

6. The container of claim 1 wherein said closure means comprises at least one "U"-shaped bracket for encompassing said other end of said sides.

7. The container of claim 6 wherein said bracket further comprise means for removing said bracket from said sides.

8. The container of claim 7 wherein said means for removing said brackets comprises pull lanyards.

9. The container of claim 1 wherein said retaining means comprises flanges extending from said sides in said open condition, which are folded substantially perpendicularly from said side in said closed condition whereby said packaged article is retained in said container.

10. The container of claim 9 wherein said retaining means further comprises a retaining plate between said article and said folded flanges.

11. The container of claim 1 wherein said compressible article is a sleeping bag.

12. The container of claim 11 having dimensions in the assembled condition of about 11 inches long by 11 inches wide by 1¾ inches thick.

13. The container of claim 1 wherein said compressible article is a parachute.

* * * * *